(No Model.)

W. H. HARFIELD.
COUPLING FOR SHAFTS.

No. 524,087. Patented Aug. 7, 1894.

Witnesses.

Inventor.

UNITED STATES PATENT OFFICE.

WILLIAM HORATIO HARFIELD, OF LONDON, ENGLAND.

COUPLING FOR SHAFTS.

SPECIFICATION forming part of Letters Patent No. 524,087, dated August 7, 1894.

Application filed May 9, 1894. Serial No. 510,638. (No model.) Patented in England November 18, 1891, No. 20,052.

*To all whom it may concern:*

Be it known that I, WILLIAM HORATIO HARFIELD, a subject of the Queen of Great Britain, residing at London, England, have invented a new and useful kind of Coupling for Shafts and the Like, (for which I have obtained a patent in Great Britain, No. 20,052, dated November 18, 1891,) of which the following is a specification.

My invention relates to a new kind of coupling designed to prevent the fracture of shafts or the like in case the same are subjected to sudden torsional strain.

In carrying out my invention I advantageously arrange upon the adjacent parts to be connected disks (or other suitably formed plates) having in them holes or slots adapted to receive the ends of a spring-bar or series of spring-bars or plates.

In practice I prefer to build up a bar of a number of flat spring-plates lying one against the other, the two ends of this spring-bar being inserted into apertures in the disks so that the said spring-bar is in axial alignment with the two parts which it connects. I may, however, arrange a series of independent bars in different parts of the disks with their axes parallel to the axis of the shaft. When dealing with heavy strains I prefer to hold the ends of the said spring-bars to prevent them from turning in their holes while allowing them lateral movement, but when slight strains are to be dealt with I leave the ends free.

To enable my invention to be fully understood I will describe how it can be carried out in practice by reference to the accompanying drawings, in which—

Figure 1:
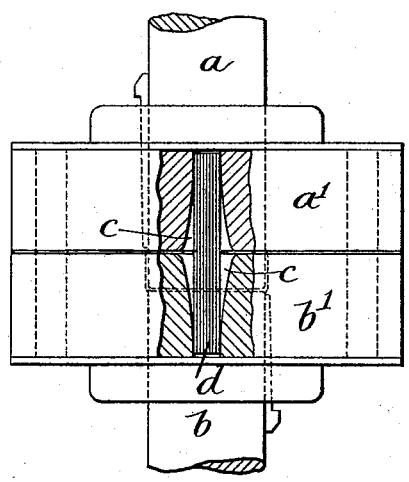
Figure 2:
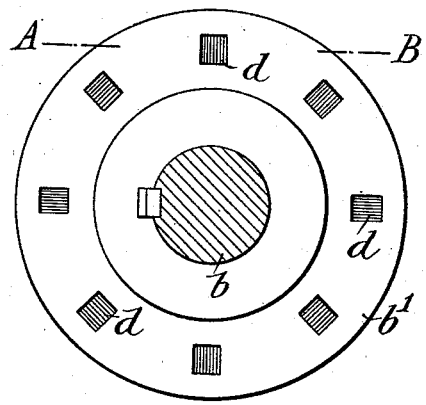

Figure 1 is a plan of the abutting ends of two shafts provided with a coupling constructed according to my invention, the parts being in the position they occupy when there is no strain upon the shaft. Fig. 2 is an elevation of Fig. 1; and Fig. 3 is a horizontal section on the line A B showing the position of the parts when the shaft is subjected to a strain.

$a$ and $b$ indicate the adjacent ends of the two shafts through which motion is to be transmitted.

$a'$ and $b'$ are the disks fixed on the ends $a$ and $b$ respectively of the shafts.

Figure 3:
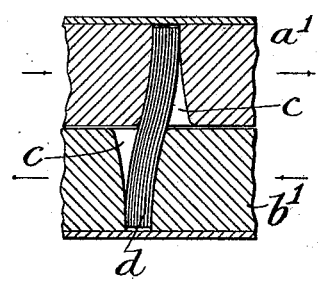

$c, c$ are the holes or slots in the disks corresponding with each other, and $d, d$ are the series of spring-bars which I place in the holes or slots $c, c$, such bars being made up of plates laid parallel with one another so as to fill the smaller ends of the holes or slots which are enlarged toward the inner faces of the disks as shown in Figs. 1 and 3.

The spring-bars $d, d$ so long as there is no torsional strain upon the shafts, are in axial alignment with the two ends of the shafts and are only held by their ends in the smaller portion of the holes or slots $c, c$, as shown in Fig. 1, but upon being subjected to a strain they bear more or less upon the wider part of the holes, thereby gradually reducing or shortening the flexible portion of the bars and increasing the resistance to the strain in an inverse ratio as will be readily understood by reference to Fig. 3 in which the arrows indicate the direction of the strain. As the strain is augmented the bars or plates bend or yield with a gradually increasing resistance until they bear upon the whole length of the sides of the holes when any further strain will be resisted by the shearing strength of the spring-bars.

My improved coupling is applicable to all kinds of shafting and the like which are subject to sudden strains such as forge and rolling mill driving shafts and it is very advantageously used in connection with the propeller shafts of steam ships in order to relieve the great and sudden torsional strains to which such shafts are subjected. It is also very advantageously used in connection with a ship's rudder for relieving the strain to which the latter is subjected when struck by a wave.

In applying my invention directly to the rudder shaft of a ship a slight modification is required, that is to say, one of the disks is keyed upon the shaft and the other is allowed to turn loosely on the shaft and form the boss of the rudder cross-head or boss of the tiller or steering quadrant.

Having now particularly described and ascertained the nature of my said invention and in what manner the same is to be performed, I declare that what I claim is—

1. A coupling for shafts and the like, comprising disks or plates fixed upon the adjacent parts to be connected and having their faces in close proximity, combined with spring-bars composed of flat plates laid one upon another in groups and parallel with the axis of the shafts, and held in holes or slots made in the said disks or plates but not fastened thereto, substantially as and for the purposes described.

2. In a coupling for shafts, disks or plates on their inner and nearly contacting ends, having holes or slots therein of larger size at their adjacent ends, combined with and carrying flat spring-bars composed of plates placed loosely one upon another in groups, in said slots, each group filling longitudinally the said slots or holes, and the inner adjacent faces of the disks having substantially no open space between them, the holes or slots serving to house and protect the springs for their whole lengths.

3. The improved shaft-coupling described, consisting of the combination of shafts $a. b$, abutting disks $a'. b'$ having in their inner side slots or cavities $c.$ larger at one end as set forth, and a series of un-attached spring bars severally composed of plates laid parallel with one another and with the axis of the shafts, such bars filling and held in the smaller ends of such slots or cavities.

WILLIAM HORATIO HARFIELD.

Witnesses:
 W. DORE,
 F. W. PRICE.